United States Patent [19]

Hoisington et al.

[11] Patent Number: 4,835,554

[45] Date of Patent: May 30, 1989

[54] INK JET ARRAY

[75] Inventors: Paul A. Hoisington, Norwich, Vt.; Robert R. Schaffer, Canaan; Kenneth H. Fischbeck, Hanover, both of N.H.

[73] Assignee: Spectra, Inc., Hanover, N.H.

[21] Appl. No.: 94,665

[22] Filed: Sep. 9, 1987

[51] Int. Cl.⁴ .......................... G01D 15/16; B41J 3/04

[52] U.S. Cl. .................................................. 346/140 R

[58] Field of Search .......................................... 346/140

[56] References Cited

U.S. PATENT DOCUMENTS

| | | | |
|---|---|---|---|
| 3,988,745 | 10/1976 | Sultan | 346/140 |
| 4,104,646 | 8/1978 | Fischbeck | 346/140 |
| 4,184,169 | 1/1980 | Taylor | 346/140 |
| 4,216,477 | 8/1980 | Matsuda | 346/140 |
| 4,375,066 | 2/1983 | Herd | 346/140 |
| 4,380,770 | 4/1983 | Maruyama | 346/140 |
| 4,521,788 | 6/1985 | Kimura | 346/140 |
| 4,525,728 | 6/1985 | Koto | 346/140 |
| 4,528,579 | 7/1985 | Brescia | 346/140 |
| 4,558,333 | 12/1985 | Sugitani | 346/140 |
| 4,568,953 | 2/1986 | Aoki et al. | 346/140 |
| 4,605,939 | 8/1986 | Hubbard | 346/140 |
| 4,611,219 | 9/1986 | Sugitani | 346/140 |
| 4,680,595 | 7/1987 | Cruz-Uribe et al. | 346/140 |
| 4,716,418 | 12/1987 | Heinzl | 346/140 X |

OTHER PUBLICATIONS

"Acoustic Nonlinearity of an Orifice", by Uno Ingard and Hartmut Ising, *The Journal of the Acoustical Society of America*, vol. 42, No. 1 (1967), pp. 6–17.

"Experimental and Theoretical Study of Wave Propagation Phenomena in Drop-on-Deman Ink Jet Devices", by D. B. Bogy and F. E. Talke, IBM J. Res. Develop., vol. 28, No. 3, May 1984, pp. 314–321.

*Primary Examiner*—Joseph W. Hartary
*Attorney, Agent, or Firm*—Brumbaugh, Graves, Donohue & Raymond

[57] ABSTRACT

In the representative embodiments of an ink jet array described in the specification, a linear array of ink jet orifices is supplied with ink from pressure chambers alternately disposed on opposite sides of the array to permit close spacing of the ink jet orifices. At the end opposite from the ink jet orifice, each pressure chamber communicates with a low acoustic impedance chamber to reflect negative pressure pulses from the pressure chamber back through the chamber as positive pulses and to prevent pressure pulses from being transmitted to the ink supply. In addition, a high-impedance passage between the low acoustic impedance chamber associated with one pressure chamber and the pressure chamber for the adjacent ink jet provides a continuous flow-through passage from the ink supply port for one ink jet to the ink supply port for an adjacent ink jet. This permits continuous circulation by thermal convection of the ink when the ink jets are not in use to prevent settling of pigment in a pigmented ink and to transport ink containing dissolved air from the region of the ink jet orifice to a deaeration passage.

11 Claims, 2 Drawing Sheets

INK JET ARRAY

BACKGROUND OF THE INVENTION

This invention relates to ink jet head arrangements and, more particularly, to a new and improved ink jet head arrangement providing a compact and highly effective array of ink jets in a convenient and efficient manner.

In conventional ink jet heads ink which is held for a period of time adjacent to the ink jet orifice while the jet is not operating tends to absorb air from the atmosphere. When the ink jet is subsequently actuated, decompression of the ink adjacent to the jet orifice when negative pressure is applied during the operating cycle of the ink jet may cause bubbles to form in the pressure chamber adjacent to the orifice. Such bubbles must be removed from the ink to avoid interference with the operation of the ink jet.

In ink jet systems using thermoplastic, or hot melt, inks, cooling and solidification of the hot melt ink in the region adjacent to the jet orifice when operation of the systems is terminated causes the ink to contract, drawing air inwardly through the orifice into the pressure chamber. As a result, the next time the ink is melted to prepare the system for use, the pressure chamber contains air bubbles which, as pointed out above, will interfere with operation unless they are removed. Furthermore, where hot melt inks containing pigment are used, the pigment can settle out of the ink and agglomerate during quiescent periods of time when the ink is kept in the molten condition but the ink jet is not being used.

To reinforce the positive pressure pulse developed by a piezoelectric crystal to eject an ink drop through the orifice of an ink jet, it has been proposed to provide a large-capacity chamber communicating with the end of the pressure chamber adjacent to the ink supply to provide a low acoustic impedance to pressure pulses from the chamber so that a negative pressure pulse applied to the pressure chamber by the piezoelectric crystal will be reflected by the low acoustic impedance chamber back through the pressure chamber as a positive pulse which is then reinforced by the piezoelectric transducer as it moves toward the ink jet orifice to eject a drop of ink. Such large-volume, low acoustic impedance chambers, however, require a very large structure for the ink jet head, preventing a compact array of closely spaced ink jets. Furthermore, if two ink jet orifices are connected to the same ink supply line, operation of one ink jet tends to influence the operation of the other ink jet connected to the same supply line, producing a cross-talk condition. More over, the spacing of ink jet orifices in an ink jet array has generally been limited by the minimum width of the pressure chambers communicating with the orifices which is usually about one millimeter.

SUMMARY OF THE INVENTION

Accordingly, it is an object of the present invention to provide a new and improved ink jet array which overcomes the above-mentioned disadvantages of the prior art.

Another object of the invention is to provide an ink jet array which avoids the effect of air introduction into the pressure chamber in a convenient and efficient way.

A further object of the invention is to provide an ink jet array in which settling of pigment from a pigmented hot melt ink during quiescent periods is effectively prevented.

An additional object of the invention is to provide a compact and efficient ink jet array having closely spaced jet orifices.

These and other objects of the invention are attained by providing an ink jet array in which each ink jet orifice communicates with a closed-loop ink path through which ink may be circulated during quiescent periods of the ink jet operation so as to maintain pigment in suspension and transport ink containing dissolved air away from the pressure chamber. To reinforce pulses generated in a pressure chamber which communicates at one end with an ink jet orifice, a low acoustic impedance chamber having a high-compliance wall portion is connected to the opposite end of the pressure chamber.

In a preferred embodiment, two adjacent ink jets are arranged with a high-impedance passage extending between the region adjacent to the orifice of one jet and the low acoustic impedance chamber communicating with the pressure chamber leading to the orifice of the other jet. In this way a closed-loop circulation path for ink supplied to each orifice is completed through the high-impedance connection and the low acoustic impedance chamber associated with the pressure chamber for the adjacent orifice. In a further preferred arrangement, the pressure chambers leading to adjacent orifices are disposed in generally parallel relation on opposite sides of a plane extending through the axes of the orifices, permitting the spacing between adjacent orifices to be approximately half the width of the related pressure chamber and pressure transducer. If the high-impedance channel is one half the acoustic length of the pressure chamber, then the positive pressure wave reflected back to the orifice through the high-impedance channel will reinforce the positive pressure wave from the pressure chamber at the orifice. This minimizes any inefficiency introduced by the presence of the circulation path.

BRIEF DESCRIPTION OF THE DRAWINGS

Further objects and advantages of the invention will be apparent from a reading of the following description in conjunction with the accompanying drawings in which.

DESCRIPTION OF PREFERRED EMBODIMENTS

Figure 1:
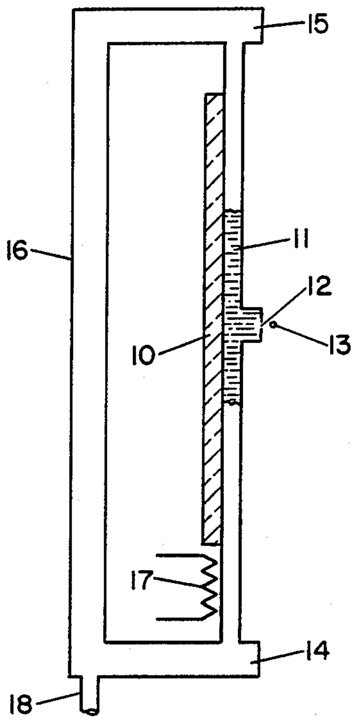
FIG. 1 is a schematic side view, partly broken away, illustrating a representative closed-loop ink path arrangement providing one arrangement for continuous ink circulation for use in an ink jet array in accordance with the invention.

In the schematic illustration of a representative ink jet head shown in FIG. 1, an acoustic transducer 10 is mounted against one wall of a pressure chamber 11 which communicates with an ink jet orifice 12 through which a drop of ink 13 is ejected by operation of the transducer 10. During each cycle of operation of the transducer 10, both positive and negative pressure pulses are applied to the ink in the pressure chamber 11.

In a drop-on-demand ink jet system, one or more of the ink jets may be kept in a quiescent condition for a substantial period of time. During such periods of time, the ink in the pressure chamber 11, which is normally maintained at a pressure slightly below atmospheric pressure to prevent weeping of the ink through the orifice, tends to absorb air from the atmosphere through the orifice which is then dissolved in the ink. When that ink jet is then activated, the negative pressure pulse applied by the transducer 10 to the ink in the pressure chamber 11 causes the dissolved air to form air bubbles which interfere with the proper ejection of ink drops 13 from the orifice 12. Moreover, in hot melt ink jet systems, the ink is normally solid at room temperature but is heated to a molten condition when the ink jet system is to be used. When such ink jet systems are not in use, the ink in the pressure chamber cools and solidifies, causing it to contract and draw air into the pressure chamber through the orifice 12, which also results in the generation of air bubbles when the ink is melted again during start-up of the system. Also, certain types of ink used in ink jet systems contain suspended pigment. If such inks are maintained in a stationary condition for extended periods of time, the pigment tends to settle out and agglomerate.

In the arrangement shown in FIG. 1, these problems are avoided by causing a pressure difference to be applied between the conduit segments 14 and 15 at the opposite ends of the pressure chamber 11 and forming a closed loop permitting continuous circulation of ink through the pressure chamber. In the illustrated embodiment, a deaeration passage 16 is provided which may, for example, be of the type described in the Hoisington et al. application Ser. No. 43,372, filed Apr. 28, 1987, now U.S. Pat. No. 4,788,556 in which dissolved air is extracted from ink through air-permeable membranes maintained at low pressure. Circulation of the ink through the closed-loop path formed by the deaeration passage 16, the conduit segments 14 and 15 and the pressure chamber 11 may be accomplished by heating one of the vertically oriented closed-loop path portions to a temperature higher than the other vertical path to induce convective circulation as described, for example, in the Hine et al. application Ser. No. 43,369, filed Apr. 28, 1987, now U.S. Pat. NO. 4,814,786. For example, a heater 17 may be arranged as shown in FIG. 1 to heat the path which includes the pressure chamber 11. In the closed-loop ink jet system shown in FIG. 1, ink is supplied to the loop through an inlet 18. Other means for producing a pressure differential for circulation may be used, for example, a peristaltic pump, a gear pump, gravity, a hydraulic ram, etc.

Figure 2:
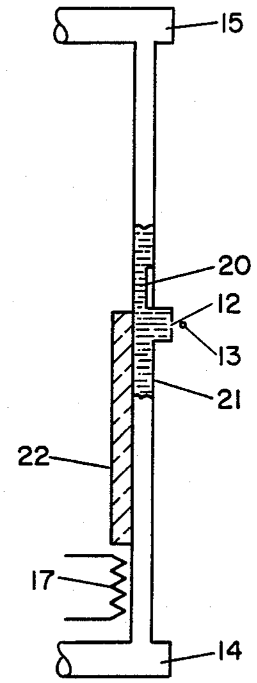
FIG. 2 is a schematic fragmentary side view, partly broken away illustrating- a high-impedance connection in a closed-loop ink flow path for use in an ink jet array in accordance with ion.

FIG. 2 illustrates a modification of the arrangement shown in FIG. 1. In this embodiment a restricted channel segment 20 is formed adjacent to the orifice 12, and the closed-loop path between the conduit segments 14 and 15 includes the restricted channel segment 20 and a pressure chamber 21 with an acoustic transducer 22. With this arrangement, convective circulation in the closed-loop path can be maintained by heating the ink in the pressure chamber 21 by means of the heater 17 since the restricted channel 20 is large enough to assure an adequate flow of ink to maintain sufficient circulation for purposes of deaeration and pigment suspension.

On the other hand, the restricted passage 20 presents a high acoustic impedance to pressure pulses applied to the pressure chamber 21 by the acoustic transducer 22. Accordingly, a positive pressure pulse applied to the pressure chamber 21 will produce a positive reflected pulse at the end of the chamber adjacent to the restricted passage 20, avoiding degradation of pressure pulses travelling from the pressure chamber 21 toward the orifice 12.

The pressure pulses induced by the transducer 22 in the pressure chamber 21 also travel in the direction away from the orifice 12 and may be dissipated or reflected back toward the orifice in such a manner as to interfere with the positive pressure pulse being applied to the orifice. Moreover, such pressure pulses may be transmitted through the ink supply line to other ink jet orifices, resulting in a cross-talk condition.

Figure 3:
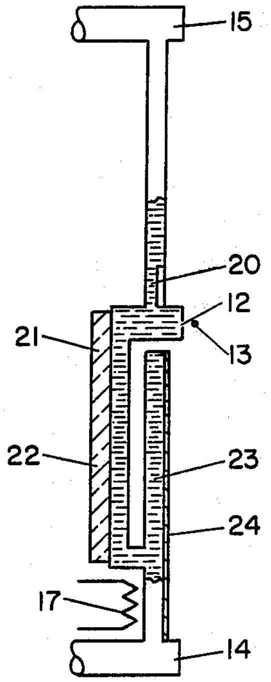
FIG. 3 is a fragmentary schematic view, partly broken away, illustrating another embodiment showing a closed-loop ink flow path for use in an ink jet array according to the invention, in which the pressure chamber communicates with a low acoustic impedance chamber.

In accordance with the invention, these problems are overcome by providing a low acoustic impedance chamber having a high-compliance wall portion between the pressure chamber and the ink supply line. With this arrangement, each positive pressure pulse from the pressure chamber is reflected as a negative pressure pulse and each negative pressure pulse is reflected as a positive pressure pulse. Thus, the transducer 22 may first be retracted to produce a negative pressure pulse and, when the reflected positive pulse is passing through the chamber toward the orifice 12, the transducer applies a positive pressure pulse to reinforce the reflected pulse. A typical arrangement for accomplishing this in accordance with the invention is illustrated in the embodiment shown in FIG. 3. In this case, the closed-loop path portion between the conduit segment 14 and the pressure chamber 21 includes a low acoustic impedance chamber 23 formed with a wall 24 having a high compliance to acoustic pressure pulses. The wall 24 may, for example, consist of a thin metal sheet such as a layer of stainless steel or beryllium copper approximately one mil thick. With such high compliance structure, the chamber 23 provides a low acoustic impedance so as to reflect negative pressure pulses received from the pressure chamber 21 back through the pressure chamber as positive pulses. Moreover, the interposition of the low acoustic impedance chamber between the pressure chamber and the ink supply prevents transmission of pressure pulses through the ink supply line so that they cannot affect the operation of other ink jets connected to the same ink supply line.

Figure 4:
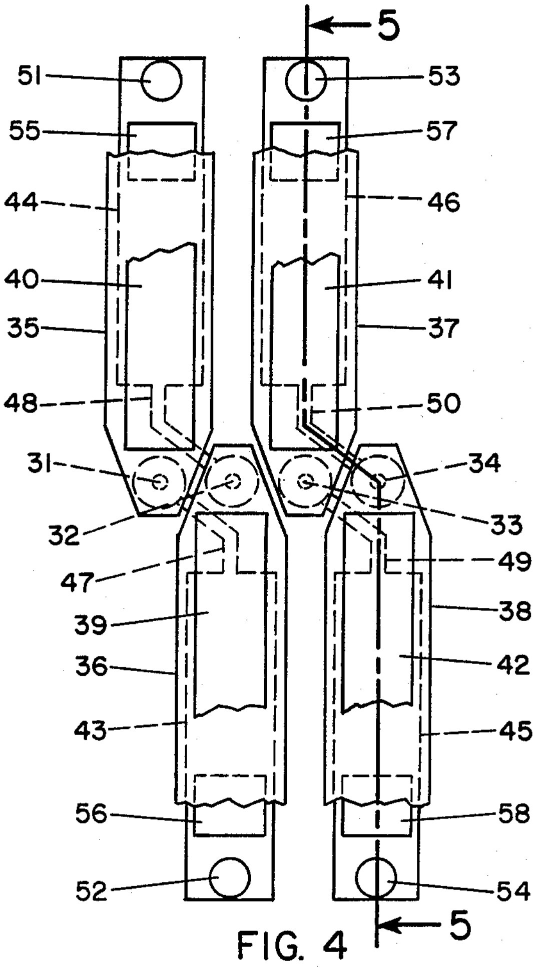
FIG. 4 is a fragmentary schematic plan view, partly broken away, illustrating the arrangement of two adjacent pairs of ink jets in an ink jet array arranged in accordance with the invention.

An array containing four ink jets incorporating the structural arrangements and providing the advantages discussed above is schematically illustrated in FIGS. 4 and 5. In the plan view shown in FIG. 4, the four jets have orifices 31, 32, 33 and 34, shown in dotted outline, and corresponding pressure chambers 35, 36, 37 and 38 and acoustic transducers 39, 40, 41 and 42, the pressure chambers and acoustic transducers being partially broken away in the illustration of FIG. 4 to assist in showing the structure. Beneath the pressure chambers as viewed in FIG. 4 are low-impedance chambers 43, 44, 45 and 46 which are coupled through corresponding narrow conduit sections 47, 48, 49 and 50 providing high-impedance passageways leading through an angled connection to the adjacent pressure chambers 35, 36, 37 and 38, respectively.

Figure 5:
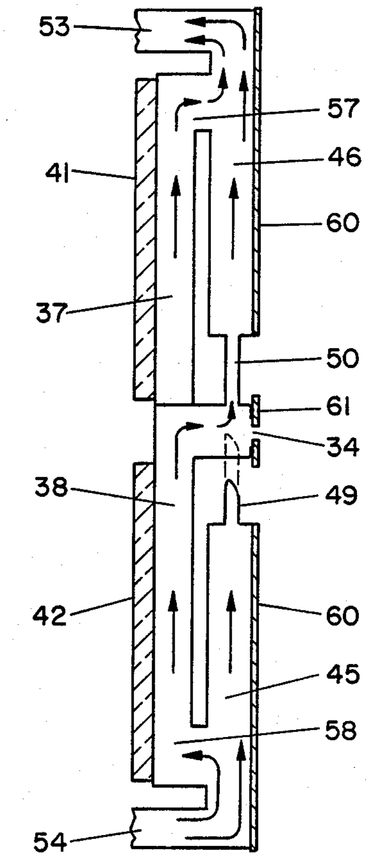
FIG. 5 is a longitudinal sectional view taken along the line 5—5 of FIG. 4 and looking in the direction of the arrows.

Ink is supplied to the ink jets through a series of supply ports 51, 52, 53 and 54 which, as shown in FIG. 5, lead into the corresponding low acoustic impedance chamber which, in turn, communicates with the corresponding pressure chamber through an opening 55, 56, 57 or 58 connecting the pressure chamber with the low acoustic impedance chamber.

As shown in the longitudinal sectional view of FIG. 5, each of the lowimpedance chambers 44–48 has a high-compliance wall 60 formed of a thin layer of metal such as one-mil-thick stainless steel so as to reflect acoustic pulses back through the pressure chamber in the manner described above and prevent them from being transmitted to the supply line and other ink jets through the ports 51–54.

Furthermore, as illustrated by the arrows in FIG. 5, the path by which ink is supplied to each of the ink jet orifices is part of a continuous flow path from one end of the ink jet head to the other end so that, when connected in a closed-loop path such as shown in FIG. 1, continuous circulation of ink may be provided. This may be accomplished by applying heat to one vertical portion of the closed-loop path by a heater of the type shown in FIG. 1 (not illustrated in FIGS. 4 and 5) so as to produce convective circulation and thereby transport ink-containing dissolved air from the pressure chamber to a deaerating device such as the device 16 described in connection with FIG. 1. Such continued ink circulation also prevents pigment in a pigmented hot melt ink from settling out or agglomerating.

Thus, as shown in FIG. 5, the flow path for ink supplied to the orifice 34, which is formed in an orifice plate 61, extends from the port 54 through the adjacent end of the low acoustic impedance chamber 45 and the opening 58 into the pressure chamber 38, past the orifice 34 into the restricted passage 50, and then through the low acoustic impedance chamber 46 and the port 53 associated with the adjacent ink jet 33. The continuous flow path for the ink jet 33 also starts at the port 54 in FIG. 5 and continues through the low acoustic impedance chamber 45 and the restricted channel 49 and, after moving adjacent to the orifice 33 (not visible in FIG. 5), passes through the pressure chamber 37 and the opening 57 to the port 53.

With this arrangement, complete closed-loop flow paths to maintain continuous circulation of ink can be provided for two adjacent ink jet orifices in a width corresponding approximately to that required for a single ink jet, thereby permitting an array of orifices to be arranged with very close spacing while preventing accumulation of dissolved air or settling of pigment in pigmented ink during inactive periods and also providing positive reflected pressure pulses to reinforce positive transducer pulses in the pressure chamber and preventing cross-talk between ink jets connected to the same ink supply line. Cross-talk may be further minimized by making the acoustic length of the ink supply conduit connected to the supply port 54 greater than the drop ejection time and by providing a second low acoustic impedance chamber (not shown) connected to that channel.

In order to provide more efficient ink jet operation in accordance with another aspect of the invention, the dynamic impedance of each ink jet orifice is preferably matched to the dynamic impedance of the corresponding pressure chamber. This matching eliminates any reflection of a pressure pulse at the orifice, which permits an increase in the maximum asynchronous operating frequency of the ink jet and also minimizes the transducer energy required to produce an ink drop having a specified velocity. For this purpose the pressure chamber dimensions and the orifice dimensions can be selected so that the impedance of the pressure chamber matches the impedance of the orifice.

The following example shows how such a impedance match can be obtained. The orifice impedance is determined by the following relation:

$$Z_o = \left[ \frac{\rho \mu}{2} + \frac{8 \mu l}{a^2} \right] \cdot \frac{1}{A_o}$$

where $\rho$ is the density of the ink, u is the velocity of the ink flowing through the orifice, $\mu$ is the viscosity of the ink, l is the length of the orifice, a is the radius of the orifice and $A_o$ is the cross-sectional area of the orifice.

The pressure chamber impedance is represented by the relation:

$$Z_c = \frac{\rho c}{A_c}$$

where $A_c$ is the cross-sectional area of the pressure chamber and c is the speed of sound in the ink.

In a typical case where the ink jet velocity is 400 inches per second, the radius of the orifice is 1 mil and the length of the orifice is 2 mils and the density of the ink is $8.6 \times 10^{-5}$ lb.sec$^2$/in$^4$ (assuming a specific gravity of 0.9) and the viscosity of the ink is 10 centipoise, or $1.4 \times 10^{-6}$ lb.sec/in$^2$, the pressure chamber impedance will match the orifice impedance if the pressure chamber cross-section is 40 mils by 10 mils (assuming that the chamber is rigid and the speed of sound is 60,000 inches per second).

Of course, because the liquid in the orifice has inertia, compliance, and nonlinear resistance, the orifice impedance can be matched exactly to the pressure chamber impedance only under conditions of steady-state flow and cannot be matched during transient conditions which occur at the leading and trailing edges of a pressure pulse. For most useful designs, however, the pressure pulse is long enough that steady-state flow takes place during a significant fraction of the pulse, and, therefore, matching of the orifice impedance to the pressure chamber impedance can provide significant advantages.

Figure 6:
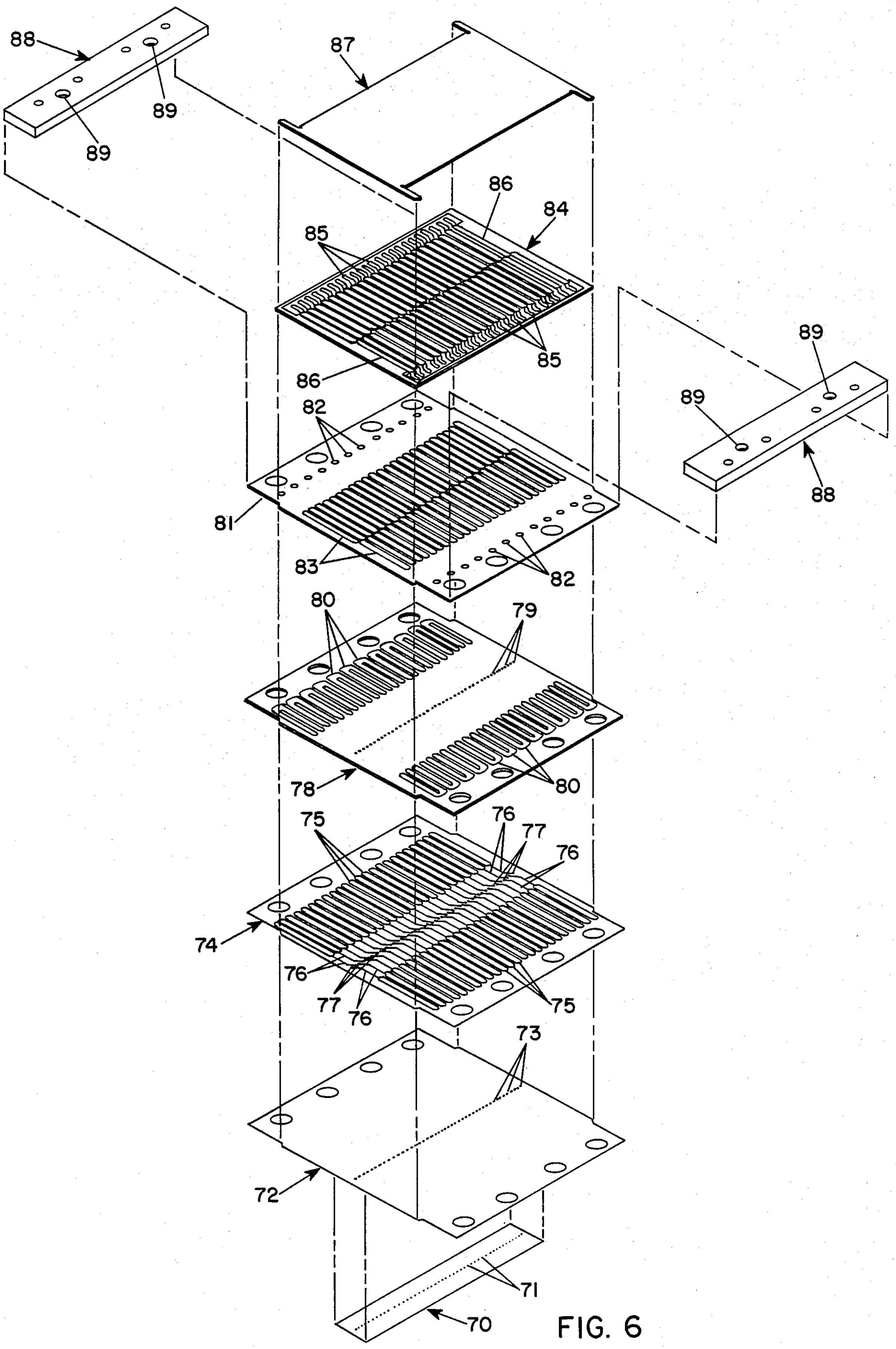
FIG. 6 is an exploded perspective view showing the arrangement of components in a representative 48-jet ink jet array accordance with the invention.

FIG. 6 illustrates, in exploded form, the components used to provide a 48-jet array embodying the various features of the invention described herein in a compact and efficient ink jet head. In this arrangement, an orifice plate 70 has a linear array of 48 ink jet orifices 71 separated from each other by about 25 mils so that the entire array is only about one and one-quarter inches long. Each orifice 71 is approximately one mil in diameter and the orifice plate is approximately two mils thick.

To form compliant sidewalls corresponding to the walls 60 of FIG. 5 for the low acoustic impedance chambers of the ink jet flow paths, a thin membrane plate 72 made of stainless steel or beryllium copper approximately one mil thick is provided and a row of apertures 73 in that plate about 10mils in diameter is aligned with the orifices 71 in the aperture plate 70 to provide communication between the orifices and the corresponding pressure chambers.

Above the membrane plate is a cavity plate 74 formed with two arrays of low acoustic impedance chamber cavities 75 disposed on opposite sides of the center line of the plate 74, each array containing 24 cavities. These correspond to the low acoustic impedance chambers 43–46 described in connection with FIGS. 4 and 5. The arrangement of the plate 74 is selected to provide the appropriate low acoustic impedance chamber characteristics and may, for example, consist of a sheet of relatively rigid material, such as beryllium copper, approximately one mil thick with each of the cavities 75 being approximately 40 mils wide and one-half inch long. A flow-through passage 76, approximately five mils wide, extends from the inner end of each of the cavities 75 to a central aperture 77, approximately 10 mils in diameter, which is aligned with the corresponding aperture 73 in the plate 72 to provide communication between the corresponding pressure chamber and ink jet orifice.

A stiffener plate 78, made of stainless steel or beryllium copper approximately ten mils thick, has a central row of 10-mil apertures 79 providing communication passages to the ink jet orifices 71 and is formed with two arrays of U-shaped passages 80, which provide ink supply passages to adjacent pairs of low acoustic impedance chambers 75, on each side of the plate. The passages 80 also communicate with corresponding pairs of pressure chambers.

Above the stiffener plate 78 is a pressure chamber plate 81 formed with two rows of ink supply apertures 82 approximately 30 mils in diameter, each positioned to communicate with the end of one of the U-shaped cavities 80 in the plate 78. In addition, the plate 81 contains two arrays of 24 pressure chamber cavities 83, providing pressure chambers corresponding to the pressure chambers 35–38 of FIGS. 4 and 5, each communicating between one leg of a U-shaped cavity 80 and an aperture 79 in the plate 78. The plate 81 may, for example, be a stainless steel or beryllium copper plate about three mils thick and each cavity 83 may be about 40 mils wide and three-eighths of an inch long with the inner end of the cavity directly over the corresponding ink jet orifice 71 and communicating apertures 73, 77 and 79 in the plates 72, 74 and 78.

Above the plate 81 is a transducer plate 84 made of piezoelectric material and having a pattern on one side coated with silver or other conductive material to provide arrays of terminals 85 and conductive strips 86. The conductive portions are arranged so that, upon appropriate energization of selected terminals 85 a portion of the piezoelectric sheet 84 adjacent to a selected pressure cavity 83 is activated in the shear mode, as described in U.S. Pat. No. 4,584,590, to produce a pressure pulse in the ink contained within the corresponding pressure chamber 83. The conductive strips coated on the piezoelectric sheet 84 are covered with an insulating layer and a backing plate 87 having its adjacent surface formed with recesses (not visible in FIG. 6) corresponding to the cavities 83 in the plate 81 is positioned above the piezoelectric plate to provide support.

In addition, two ink distribution plates 88 are mounted above the ink supply apertures 82 on the opposite sides of the plate 81 to direct ink to the apertures 82. In the illustrated embodiment, each supply plate 88 has two apertures 89, each of which communicates with a duct (not visible in FIG. 6) in the lower surface of the plate 88 providing communication with six apertures 82 in the plate 81. Since each aperture 82 communicates with a corresponding aperture at the opposite side of the plate 81 by way of the cavities 75, flow-through passages 76 and pressure chambers 83, the same color of ink must be used in each adjacent pair of ink jets which are supplied with ink from opposite sides of the plate 81.

In the embodiment shown in FIG. 6, because only two ink supply apertures 89 are provided on each side of the plate, only two different colors of ink could be used in the 48-jet-. ink jet array. On the other hand, if the U-shaped ducts 80 in the plate 78 were replaced by a separate channel for each of the pressure chamber cavities 83 and corresponding low acoustic impedance chambers 75 and corresponding apertures were provided in the plates 81 and 88, different colors of ink could be supplied to every adjacent pair of jet orifices if desired.

When assembled in the manner indicated by the dotted lines in FIG. 6, the 48-jet- array is arranged and operated in the same manner described with respect to FIGS. 4 and 5, providing continuous flow-through passages formed by the ink supply apertures 89, 82 and the channels 80, the pressure chambers 83 and apertures 79 and 77 communicating with the orifices 71 followed by the flow-through passages 76 and the low acoustic impedance chamber 75 and the supply ducts 80 and apertures 82 and 88 on the opposite side of the array.

This type of structure is easily fabricated by employing stamped or chemically etched metal parts and a piezoelectric transducer patterned by photolithography, screen printing, abrasion or the like. The metal parts may then be electroplated with a filler material such as solder, gold or nickel alloy and soldered or brazed in a single step to complete the final assembly. If the soldering or brazing operation is done at less than about 250° C., the piezoelectric transducer will not be depoled.

Although the invention has been described herein with reference to specific embodiments, many modifications and variations therein will readily occur to those skilled in the art. Accordingly, all such variations and modifications are included within the intended scope of the invention as defined by the following claims.

We claim:

1. An ink jet array comprising a plurality of ink jet orifices through which ink is selectively ejected by pressure pulses, a plurality of pressure chamber means, one communicating with each of the ink jet orifices, a corresponding plurality of transducer means for imparting pressure pulses to ink in the corresponding pressure chamber means, a corresponding plurality of inlet means for supplying ink to each of the pressure chamber means, and a corresponding plurality of flow-through passage means providing communication between each ink jet orifice and the inlet means for supplying ink to another ink jet orifice without passing through a pressure chamber means.

2. An ink jet array according to claim 1 wherein the pressure chamber means communicating with adjacent ink jet orifices are disposed on opposite sides of a line join the orifices.

3. An ink jet array according to claim 1 including a plurality of low acoustic impedance chamber means, means, each communicating with a corresponding ink jet orifice.

4. An ink jet array according to claim 3 wherein each low acoustic impedance chamber means includes high-compliance wall means providing a low impedance to acoustic pulses within the chamber.

5. An ink jet array Comprising a plurality of ink jet orifices through which ink is selectively ejected by pressure pulses, a plurality of pressure chamber means, one communicating with each of the ink jet orifices, a corresponding plurality of transducer means for imparting pressure pulses to ink in the corresponding pressure chamber means, a corresponding plurality of inlet means for supplying ink to each of the pressure chamber means, a corresponding plurality of flow-through passage means providing communication between the region of a pressure chamber means adjacent to the corresponding orifice and the ink supply means communicating with the pressure chamber means for the adjacent ink jet orifice, and a plurality of low acoustic impedance chamber means, each communicating with a corresponding pressure chamber means at a location spaced from the corresponding ink jet orifice, wherein each low acoustic impedance chamber means includes high-compliance wall means providing a low impedance to acoustic pulses within the chamber and wherein the flow-through passage means includes a high-impedance ink passage extending between the pressure chamber means of one ink jet and the low acoustic impedance chamber means of one ink jet and the low acoustic impedance chamber means of an adjacent ink jet.

6. An ink jet array comprising a plurality of ink jet orifice means and a corresponding plurality of pressure chambers means communicating with the ink jet orifice means wherein the dynamic impedance of each orifice means is substantially matched to the dynamic impedance of each orifice means is substantially matched to the dynamic impedance of the corresponding pressure chamber means.

7. An ink jet array according to claim 6 wherein the diameter and thickness of the orifice in the orifice means and the cross-sectional area of the pressure chamber in the pressure chamber means are selected so as to substantially match the dynamic impedance of the orifice means to the dynamic impedance of the pressure chamber means.

8. An ink jet array comprising a plurality of aligned ink jet orifices, a corresponding plurality of elongated pressure chamber means each having a central axis and communicating with one of the ink jet orifices, a corresponding plurality of ink supply means for supplying ink to each of the pressure chamber means, wherein the pressure chamber means and ink supply means for supplying ink to adjacent ink jet orifices are disposed on opposite sides of a line joining the orifices with the central axes of the pressure chamber means on one side of the line extending between the central axes of the pressure chamber means on the other side of the line and including high-impedance channel means extending between the pressure chamber means communicating with one of the ink jet orifices and the low acoustic impedance chamber means communicating with the pressure chamber means for an adjacent ink jet orifice to provide a flow-through path between the ink supply means for the adjacent ink jet orifices.

9. An ink jet head including at least two orifices for projecting ink toward a substrate, a pressure chamber means for each of the orifices to supply pressure pulses for controlling the projection of ink from the orifice, two ink supply conduit means, each supplying ink to one of the pressure chamber means, and flow-through passage means for conducting ink from the pressure chamber means for one orifice to the ink supply conduit means for supplying ink to the pressure chamber means for the other orifice.

10. An ink jet head according to claim 9 including ink circulating means for causing circulation of ink from the ink supply conduit means and the pressure chamber means for one of the orifices and the flow-through passage means to the ink supply means for the pressure chamber means leading to the other orifice.

11. An ink jet head according to claim 9 wherein the flow-through passage means from the pressure chamber means of one of the orifices includes low acoustic impedance chamber means coupled to the pressure chamber means leading to the other orifice.

* * * * *

UNITED STATES PATENT AND TRADEMARK OFFICE
CERTIFICATE OF CORRECTION

PATENT NO. : 4,835,554
DATED : May 30, 1989
INVENTOR(S) : Paul A. Hoisington et al.

It is certified that error appears in the above-identified patent and that said Letters Patent is hereby corrected as shown below:

Column 1, line 53: The words "More over" should read --Moreover--.

Column 2, line 55: The word "ion" should read --the invention--.

Column 5, line 15: The word "lowimpedance" should read --low-impedance--.

Column 6, line 20: The word "ρμ" should read --ρu--.

Column 8, line 66: The word "join" should read --joining--.

Column 9, line 1: Delete "means," and after "a" insert --corresponding pressure chamber means at a location spaced from the--; line 7: The word "Comprising" should read --comprising--; lines 30-31: Delete "of one ink jet and the low acoustic impedance chamber means"; lines 37-38: Delete "of each orifice means is substantially matched to the dynamic impedance".

Signed and Sealed this

Twenty-seventh Day of March, 1990

*Attest:*

JEFFREY M. SAMUELS

*Attesting Officer* *Acting Commissioner of Patents and Trademarks*